(12) United States Patent
Uemura et al.

(10) Patent No.: US 11,255,257 B2
(45) Date of Patent: Feb. 22, 2022

(54) TURBOCHARGER

(71) Applicant: KABUSHIKI KAISHA TOYOTA JIDOSHOKKI, Aichi-ken (JP)

(72) Inventors: Akihito Uemura, Kariya (JP); Toshiya Kato, Kariya (JP); Shuichi Fujita, Kariya (JP); Katsumi Okayama, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 201 days.

(21) Appl. No.: 16/641,438

(22) PCT Filed: Aug. 27, 2018

(86) PCT No.: PCT/JP2018/031602
§ 371 (c)(1),
(2) Date: Feb. 24, 2020

(87) PCT Pub. No.: WO2019/044775
PCT Pub. Date: Mar. 7, 2019

(65) Prior Publication Data
US 2020/0200073 A1    Jun. 25, 2020

(30) Foreign Application Priority Data

Aug. 28, 2017   (JP) .............................. JP2017-163279

(51) Int. Cl.
*F02B 37/24* (2006.01)
*F01D 17/16* (2006.01)

(52) U.S. Cl.
CPC ............ *F02B 37/24* (2013.01); *F01D 17/165* (2013.01); *F16C 2360/24* (2013.01)

(58) Field of Classification Search
CPC ........ F01D 25/145; F01D 25/30; F01D 25/26; F01D 17/165; F01D 9/026; F02B 37/24;
(Continued)

(56) References Cited

U.S. PATENT DOCUMENTS

| | | | |
|---|---|---|---|
| 9,447,698 B2* | 9/2016 | Grussmann | ............... F02C 6/12 |
| 11,118,501 B2* | 9/2021 | Yoshida | .................. F02B 39/00 |

(Continued)

FOREIGN PATENT DOCUMENTS

| | | |
|---|---|---|
| CN | 110139974 A | 8/2019 |
| JP | 2003-227344 | 8/2003 |

(Continued)

OTHER PUBLICATIONS

International Search Report issued in International Patent Application No. PCT/JP2018/031602, dated Oct. 2, 2018.

*Primary Examiner* — Audrey B. Walter
*Assistant Examiner* — Dapinder Singh
(74) *Attorney, Agent, or Firm* — Greenblum & Bernstein, P.L.C.

(57) ABSTRACT

A turbocharger includes a turbine housing, an annular metal plate, and a scroll passage defining plate. The metal plate defines a connecting passage in the turbine housing. The connecting passage connects a turbine chamber and a turbine scroll passage to each other. The scroll passage defining plate includes a passage defining portion that defines the turbine scroll passage and an inner circumferential edge portion that extends from the inner circumferential edge portion of the passage defining portion and along the metal plate. The scroll passage defining plate has an inner circumferential edge that is fixed between the turbine housing and the metal plate. The scroll passage defining plate is arranged in the turbine housing such that the outer circumferential edge portion of the passage defining portion is movable relative to the turbine housing.

15 Claims, 6 Drawing Sheets

(58) Field of Classification Search
CPC ............. F16C 2360/24; F05D 2220/40; F05D 2230/54; F05D 2260/231; F05D 2300/5024; F05D 2240/15; Y02T 10/12; Y02T 10/40
See application file for complete search history.

(56) References Cited

U.S. PATENT DOCUMENTS

| | | |
|---|---|---|
| 2012/0031092 A1 | 2/2012 | Sumser et al. |
| 2014/0037436 A1 | 2/2014 | Tabata |
| 2014/0119907 A1 | 5/2014 | Maeda et al. |
| 2014/0212277 A1* | 7/2014 | Uesugi ................. F01D 17/145 415/151 |
| 2016/0115823 A1 | 4/2016 | Henke et al. |
| 2016/0290163 A1 | 10/2016 | Yokoyama et al. |
| 2017/0204743 A1 | 7/2017 | Yokoyama et al. |
| 2018/0245481 A1* | 8/2018 | Hossbach ............... F01D 25/26 |
| 2019/0316516 A1 | 10/2019 | Arai |

FOREIGN PATENT DOCUMENTS

| | | |
|---|---|---|
| JP | 2012-524854 | 10/2012 |
| JP | 5610067 | 10/2014 |
| JP | 5880463 | 3/2016 |
| JP | 6060315 | 1/2017 |
| JP | 6126246 | 5/2017 |
| WO | WO2013/005319 | 1/2013 |
| WO | WO2016/071959 | 5/2016 |

\* cited by examiner

TURBOCHARGER

TECHNICAL FIELD

The present invention relates to a turbocharger.

BACKGROUND ART

A turbocharger includes a bearing housing, a turbine housing, and a compressor housing. The bearing housing rotationally supports an impeller shaft. The turbine housing is coupled to a first end of the bearing housing. Exhaust gas discharged from an internal combustion engine flows inside the turbine housing. The compressor housing is coupled to a second end of the bearing housing. Intake air conducted to the internal combustion engine flows inside the compressor housing. The turbine housing has a turbine chamber. The turbine chamber accommodates a turbine impeller, which is coupled to a first end of the impeller shaft and is rotated integrally with the impeller shaft by exhaust gas drawn into the turbine chamber. The compressor housing accommodates a compressor impeller, which is coupled to a second end of the impeller shaft and is rotated integrally with the impeller. When the turbine impeller is rotated by exhaust gas discharged from the internal combustion engine, so that the compressor impeller is rotated integrally with the turbine impeller through the impeller shaft, the intake air flowing through the compressor housing is compressed by the rotation of the compressor impeller, so that the compressed intake air is supplied to the internal combustion engine. Such forced induction of intake air into the internal combustion engine performed by the turbocharger increases the intake efficiency of the internal combustion engine, thereby improving the performance of the internal combustion engine.

The turbocharger includes a catalyst that purifies exhaust gas on the downstream side of the turbine housing in the flowing direction of the exhaust gas. When heated to a temperature higher than or equal to the activation temperature, the catalyst exerts exhaust gas purifying capability. Thus, for example, when the exhaust gas temperature is low, the catalyst is not heated to a temperature higher than or equal to the activation temperature, so that the catalyst may not sufficiently purify the exhaust gas.

Typically, since a turbine housing needs to have a sufficient stiffness, the turbine housing is formed through casting to have thick walls. Accordingly, the turbine housing has a large mass and a large heat capacity. Thus, the heat of the exhaust gas flowing through the turbine housing is removed, so that the temperature is reduced. This extends the time for the catalyst to reach the activation temperature. Therefore, under the operating condition in which there is a demand for early warm-up of the catalyst, for example, during cold start of the internal combustion engine, the catalyst cannot be heated to a temperature higher than or equal to the activation temperature at an early stage.

As such, the turbocharger of Patent Document 1 includes a turbine scroll passage that is a part of the passage for conducting exhaust gas that has flowed into the turbine housing to the turbine housing. A part of the wall surface of the turbine scroll passage is constituted by a scroll passage defining plate (a heat shield plate). The scroll passage defining plate limits the transfer of heat from the exhaust gas to the turbine housing. This limits the reduction in the temperature of the exhaust gas while the exhaust gas flows through the turbine housing.

The turbocharger of Patent Document 1 also includes nozzle vanes (a variable valve). The nozzle vanes are pivotally supported by a first plate and a second plate, which are arranged to be opposed to each other. The first plate and the second plate define a connecting passage that connects the turbine scroll passage and the turbine chamber to each other in the turbine housing. The nozzle vanes are capable of changing the flow passage area of the connecting passage and regulates the flow velocity of the exhaust gas conducted to the turbine chamber.

PRIOR ART DOCUMENT

Patent Document

Patent Document 1: Japanese Patent No. 5880463

SUMMARY OF THE INVENTION

Problems that the Invention is to Solve

In Patent Document 1, one of the peripheral portions of the scroll passage defining plate is fixed by being held between the turbine housing and the bearing housing, and the other edge portion is fixed by being held between the turbine housing and the second plate. This configuration does not readily allow for thermal expansion of the scroll passage defining plate when the scroll passage defining plate is warmed up by exhaust gas. The scroll passage defining plate thus may receive an excessive stress locally.

Accordingly, it is an objective of the present invention to provide a turbocharger that allows for thermal expansion of a scroll passage defining plate.

Means for Solving the Problems

To achieve the foregoing objective, a turbocharger is provided that includes a bearing housing, a turbine housing, a turbine chamber, a turbine impeller, a turbine scroll passage, a connecting passage, an annular metal plate, and a scroll passage defining plate. The bearing housing rotationally supports an impeller shaft. The turbine housing is a cast component coupled to an end of the bearing housing in a rotation axis direction of the impeller shaft. Exhaust gas discharged from an internal combustion engine flows inside the turbine housing. The turbine chamber is defined in the turbine housing. The turbine impeller is accommodated in the turbine chamber and is configured to be rotated integrally with the impeller shaft by exhaust gas drawn into the turbine chamber. The turbine scroll passage is defined in the turbine housing and is a part of a passage for conducting exhaust gas that has flowed into the turbine housing to the turbine chamber. The turbine scroll passage surrounds a circumference of the turbine chamber. The connecting passage is defined in the turbine housing and connects the turbine scroll passage and the turbine chamber to each other. The annular metal plate constitutes a part of a wall surface of the connecting passage. The scroll passage defining plate includes a passage defining portion and an inner circumferential edge. The passage defining portion is arranged such that a predetermined clearance is provided between the passage defining portion and the turbine housing. The passage defining portion constitutes a part of a wall surface of the turbine scroll passage. The inner circumferential edge extends from an inner circumferential edge portion of the passage defining portion and along the metal plate. The scroll passage defining plate is arranged in the turbine housing such that: the inner circumferential edge is fixed between the turbine housing and the metal plate; and an outer circumferential edge portion of the passage defining portion that is on a side opposite from the inner circumferential edge portion is movable relative to the turbine housing.

The outer circumferential edge portion of the scroll passage defining plate, which is on the opposite side from the inner circumferential edge portion in the passage defining portion, is movable relative to the turbine housing. This configuration allows for thermal expansion of the scroll passage defining plate when the scroll passage defining plate is warmed up by exhaust gas.

In the above-described turbocharger, the scroll passage defining plate may be arranged in the turbine housing such that the outer circumferential edge portion of the passage defining portion and an inner circumferential surface of the turbine housing are spaced apart from each other.

The outer circumferential edge portion of the passage defining portion and the inner circumferential surface of the turbine housing are spaced apart from each other. This configuration allows for thermal expansion of the scroll passage defining plate when the scroll passage defining plate is warmed up by exhaust gas.

The above-described turbocharger may further include an elastic member configured to provide a clearance between the passage defining portion of the scroll passage defining plate and the turbine housing.

If the elastic member is arranged between the outer circumferential end and the turbine housing, elastic deformation of the elastic member allows for thermal expansion of the scroll passage defining plate when the scroll passage defining plate is warmed up by exhaust gas.

In the above-described the turbocharger, the elastic member may be arranged between the outer circumferential edge portion of the passage defining portion and the turbine housing, and the outer circumferential edge portion of the passage defining portion may be supported by the turbine housing with the elastic member in between.

The outer circumferential edge portion of the passage defining portion of the scroll passage defining plate is supported by the turbine housing with the scroll elastic member. This configuration suppresses vibrations of the scroll passage defining plate.

The above-described turbocharger according may further include an annular leaf spring that is arranged between the inner circumferential edge of the scroll passage defining plate and the turbine housing. The scroll passage defining plate may be fixed by holding the inner circumferential edge between the leaf spring and the metal plate.

If the scroll passage defining plate is fixed to the turbine housing by holding the inner circumferential edge of the scroll passage defining plate between the leaf spring and the metal plate, the contact area between the turbine housing and the scroll passage defining plate is reduced. This limits the transfer of heat from the exhaust gas flowing through the turbine scroll passage to the turbine housing.

In the above-described turbocharger, the scroll passage defining plate may be fixed by holding the inner circumferential edge between the turbine housing and the metal plate.

Since the inner circumferential edge of the scroll passage defining plate is held between the turbine housing and the metal plate, the inner circumferential edge of the scroll passage defining plate is fixed to the turbine housing.

In the above-described turbocharger, the scroll passage defining plate may include an outer circumferential wall that constitutes an outer circumferential interior surface of the turbine scroll passage, an inner circumferential wall that is located inward from the outer circumferential wall in a radial direction of the impeller shaft and constitute an inner circumferential interior surface of the turbine scroll passage, and a linking wall that links the outer circumferential wall and the inner circumferential wall to each other. The inner circumferential edge of the scroll passage defining plate may extend from the inner circumferential wall and inward in the radial direction of the impeller shaft.

If the scroll passage defining plate includes the linking wall and the inner circumferential edge in addition to the inner circumferential wall and the outer circumferential wall, the scroll passage defining plate has a sufficient stiffness.

In the above-described turbocharger, a heat insulator may be arranged in the clearance between the passage defining portion of the scroll passage defining plate and the turbine housing.

If the heat insulator is arranged in the clearance between the passage defining portion of the scroll passage defining plate and the turbine housing, the transfer of heat from the exhaust gas flowing through the turbine scroll passage to the turbine housing is limited.

The above-described turbocharger further includes a plurality of nozzle vanes that is arranged in the connecting passage and causes exhaust gas in the turbine scroll passage to flow to the turbine chamber. The metal plate may support the nozzle vanes.

If the metal plate supports the nozzle vanes, the same member can be used as the member that supports the inner circumferential edge of the scroll passage defining plate and the member that supports the nozzle vanes.

In the above-described turbocharger, the nozzle vanes may be movable vanes that are pivotally supported by the metal plate so as to be capable of changing a flow passage area of the connecting passage. The turbocharger may further include a metal support plate. The support plate may cooperate with the metal plate to pivotally support the nozzle vanes and is arranged to be opposed to the metal plate so as to constitute a part of the wall surface of the connecting passage.

If the metal support plate, which supports the nozzle vanes, is arranged to be opposed to the metal plate, the connecting passage is provided between the support plate and the metal plate. Further, the movable vanes are capable of changing the flow passage area of the connecting passage.

The above-described turbocharger may further include a metal annular plate. The annular plate may be arranged to be opposed to the scroll passage defining plate so as to constitute a part of the wall surface of the turbine scroll passage. An outer circumferential edge of the annular plate may be held between the turbine housing and the bearing housing.

A part of the wall surface of the turbine scroll passage is made of the metal annular plate. This limits the transfer of heat from the exhaust gas flowing through the turbine scroll passage to the turbine housing.

The above-described turbocharger may further include a metal annular plate. The annular plate may be arranged to be opposed to the scroll passage defining plate so as to constitute a part of the wall surface of the turbine scroll passage. A thickness of the annular plate may be smaller than a thickness of the support plate and a thickness of the metal plate. An outer circumferential edge of the annular plate may be held between the turbine housing and the bearing housing.

If the annular plate, which is thinner and has a smaller heat capacity than the support plate and the metal plate, constitutes the wall surface of the turbine scroll passage, the reduction in the temperature of the exhaust gas flowing through the turbine scroll passage is limited.

In the above-described the turbocharger, the annular plate may include an annular rib. The rib may protrude from an inner circumferential portion of the annular plate in the rotation axis direction of the impeller shaft and extends away from the scroll passage defining plate.

When the annular plate includes an annular rib, the annular plate has a sufficient stiffness as compared to a case in which the annular plate does not have a rib. Also, vibrations in a section close to the inner circumferential portion of the annular plate are suppressed as compared to a case in which the annular plate does not have the rib.

In the above-described turbocharger, the scroll passage defining plate may include a flange portion that extends from the outer circumferential edge portion of the passage defining portion and outward in the radial direction of the impeller shaft. A clearance may be provided between the flange portion and the annular plate. The flange portion may extend along the annular plate.

If the clearance is provided between the flange portion of the scroll passage defining plate and the annular plate, thermal expansion of the scroll passage defining plate is permitted.

In the above-described turbocharger, the flange portion may extend outward in the radial direction of the impeller shaft such that a clearance is provided between the flange portion of the scroll passage defining plate and the inner circumferential surface of the turbine housing.

If the clearance is provided between the flange portion and the inner circumferential surface of the turbine housing, the space provided between the passage defining portion of the scroll passage defining plate and the inner circumferential surface of the turbine housing is connected to the interior of the turbine scroll passage. This is unlikely to cause a pressure difference between the interior of the turbine scroll passage and the space provided between the passage defining portion of the scroll passage defining plate and the inner circumferential surface of the turbine housing. This limits deformation of the scroll passage defining plate caused by the pressure difference.

MODES FOR CARRYING OUT THE INVENTION

A turbocharger according to one embodiment will now be described with reference to FIGS. 1 to 3.

Figure 1:
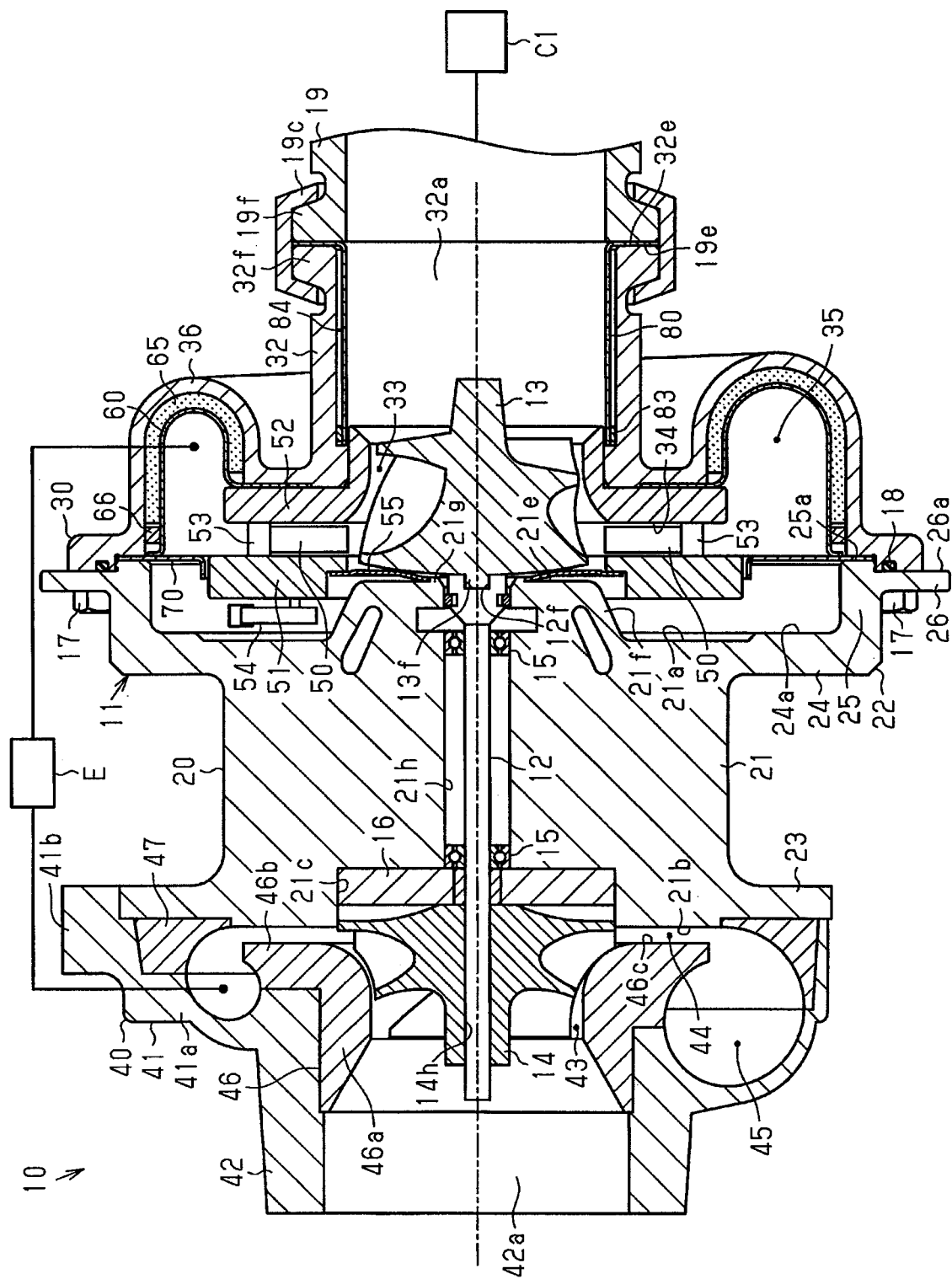
FIG. 1 is a cross-sectional side view of a turbocharger according to an embodiment.

As shown in FIG. 1, a turbocharger 10 includes a case 11 that includes a bearing housing 20, a turbine housing 30, and a compressor housing 40. The bearing housing 20, the turbine housing 30, and the compressor housing 40 are cast components. Exhaust gas discharged from an internal combustion engine E flows through the turbine housing 30. Intake air to be drawn into the internal combustion engine E flows through the compressor housing 40.

The bearing housing 20 rotationally supports an impeller shaft 12. A turbine impeller 13 is coupled to a first end of the impeller shaft 12 in the rotation axis direction. A compressor impeller 14 is coupled to a second of the impeller shaft 12 in the rotation axis direction. The turbine housing 30 is coupled to a first of the bearing housing 20 in the rotation axis direction of the impeller shaft 12. The compressor housing 40 is coupled to a second of the bearing housing 20 in the rotation axis direction of the impeller shaft 12.

The bearing housing 20 includes a tubular main body 21. The main body 21 has an insertion hole 21h, through which the impeller shaft 12 is inserted. The main body 21 rotationally supports the impeller shaft 12, which is inserted through the insertion hole 21h, with radial bearings 15. The axial direction of the main body 21 matches the rotation axis direction of the impeller shaft 12.

The main body 21 has a first end face 21a, which is located at a first end in the rotation axis direction of the impeller shaft 12, and a second end face 21b, which is located at a second end in the rotation axis direction of the impeller shaft 12. The main body 21 has an annular protrusion 21f, which protrudes from the first end face 21a. The protrusion 21f has a flat end face 21e at the distal end. The end face 21e extends in the radial direction of the impeller shaft 12. A first end of the insertion hole 21h opens in the end face 21e of the protrusion 21f. An annular protuberance 21g is provided on the end face 21e of the protrusion 21f. The protuberance 21g projects from the end face 21e so as to surround the opening of the insertion hole 21h.

The main body 21 has a columnar accommodation recess 21c provided in the second end face 21b. A second end of the insertion hole 21h opens in the bottom surface of the accommodation recess 21c. The diameter of the accommodation recess 21c is larger than the diameter of the insertion hole 21h. The axis of the accommodation recess 21c matches the axis of the insertion hole 21h. The accommodation recess 21c accommodates a thrust bearing 16. The thrust bearing 16 is accommodated in the accommodation recess 21c while contacting the bottom surface of the accommodation recess 21c.

The bearing housing 20 includes a first flange portion 22 and a second flange portion 23. The first flange portion 22 protrudes outward in the radial direction of the impeller shaft 12 from the first end in the axial direction of the main body 21 on the outer circumferential surface of the main body 21. The second flange portion 23 protrudes outward in the radial direction of the impeller shaft 12 from the second end in the axial direction of the main body 21 on the outer circumferential surface of the main body 21. The second flange portion 23 is annular.

The first flange portion 22 has an annular first extended portion 24, a cylindrical second extended portion 25, and an annular third extended portion 26. The first extended portion 24 extends outward in the radial direction of the impeller shaft 12 from the outer circumferential surface of the main body 21. The second extended portion 25 extends away from the second flange portion 23 in the rotation axis direction of the impeller shaft 12 from the distal end of the first extended portion 24. The third extended portion 26 extends outward in the radial direction of the impeller shaft 12 from a section that is slightly closer to the first extended portion 24 in the rotation axis direction than an end face 25a of the second extended portion 25.

The first extended portion 24 has an end face 24a that is on the opposite side from the second flange portion 23 and is continuous with the first end face 21a of the main body 21. The third extended portion 26 has an end face 26a located on the opposite side from the first extended portion 24. The end face 25a of the second extended portion 25 is farther from the first extended portion 24 than the end face 26a of the third extended portion 26. The end face 25a of the second extended portion 25 is a flat surface that extends in the radial direction of the impeller shaft 12.

The compressor housing 40 has a compressor main body 41. The compressor main body 41 has a substantially disk-shaped end wall 41a and an annular circumferential wall 41b, which extends in the rotation axis direction of the impeller shaft 12 from the circumferential edge of the end wall 41a. The end of the circumferential wall 41b on the opposite side from the end wall 41a is open. The compressor housing 40 is coupled to the second end of the bearing housing 20 by attaching the second flange portion 23 to the open end of the circumferential wall 41b with bolts (not shown). The opening of the circumferential wall 41b is closed by the second end face 21b of the main body 21 and the end face of the second flange portion 23 on the opposite side from the first flange portion 22. That is, the opening of the circumferential wall 41b is closed by the end face located at the second end of the bearing housing 20.

The compressor housing 40 further has a compressor tubular portion 42, which protrudes from the end wall 41a. The compressor tubular portion 42 extends away from the circumferential wall 41b. The compressor tubular portion 42 has an intake port 42a. The intake port 42a extends in the rotation axis direction of the impeller shaft 12. The axis of the intake port 42a matches the rotation axis of the impeller shaft 12.

The compressor housing 40 has a compressor impeller chamber 43, a diffuser passage 44, and a compressor scroll passage 45. The compressor impeller chamber 43 is connected to the intake port 42a and accommodates the compressor impeller 14. The compressor scroll passage 45 spirals around the outer circumference of the compressor impeller chamber 43. The diffuser passage 44 extends annularly about the compressor impeller chamber 43 and connects the compressor impeller chamber 43 and the compressor scroll passage 45 to each other.

An annular shroud member 46 is provided in the compressor housing 40. The shroud member 46 includes a cylindrical portion 46a, which extends in the axial direction along the inner circumferential surface of the compressor tubular portion 42, and an annular portion 46b, which extends from an end in the axial direction of the cylindrical portion 46a along the end wall 41a. The compressor impeller chamber 43 is a space surrounded by the cylindrical portion 46a of the shroud member 46 and the accommodation recess 21c of the bearing housing 20.

The compressor impeller 14 has a shaft insertion hole 14h, which extends in the rotation axis direction of the impeller shaft 12. The impeller shaft 12 can be passed through the shaft insertion hole 14h. The second end in the rotation axis direction of the impeller shaft 12 projects into the compressor impeller chamber 43. The compressor impeller 14 is attached to the impeller shaft 12, for example, with a nut, while the part of the impeller shaft 12 projecting into the compressor impeller chamber 43 is inserted through the shaft insertion hole 14h, such that the compressor impeller 14 is integrally rotational with the impeller shaft 12. The end of the compressor impeller 14 that is closer to the bearing housing 20 is supported by the thrust bearing 16 with a sealing collar or a thrust collar (neither is shown) in between. The thrust bearing 16 receives the load that acts on the compressor impeller 14 in the thrust direction (axial direction).

The annular portion 46b of the shroud member 46 includes a flat surface 46c, which is opposed to the bearing housing 20. The flat surface 46c extends in the radial direction of the impeller shaft 12. The diffuser passage 44 is provided between the flat surface 46c of the annular portion 46b and the second end face 21b of the bearing housing 20, which is opposed to the flat surface 46c in the rotation axis direction of the impeller shaft 12.

An annular scroll member 47 is provided in the compressor housing 40. The scroll member 47 extends about the shroud member 46. The compressor scroll passage 45 is defined by the outer circumferential surface of the annular portion 46b of the shroud member 46, the end wall 41a of the compressor main body 41, and the inner circumferential surface of the shroud member 46. The scroll member 47 and the shroud member 46 do not necessarily need to be components separate from the compressor housing 40, but may be integrated with the compressor housing 40.

Figure 2:
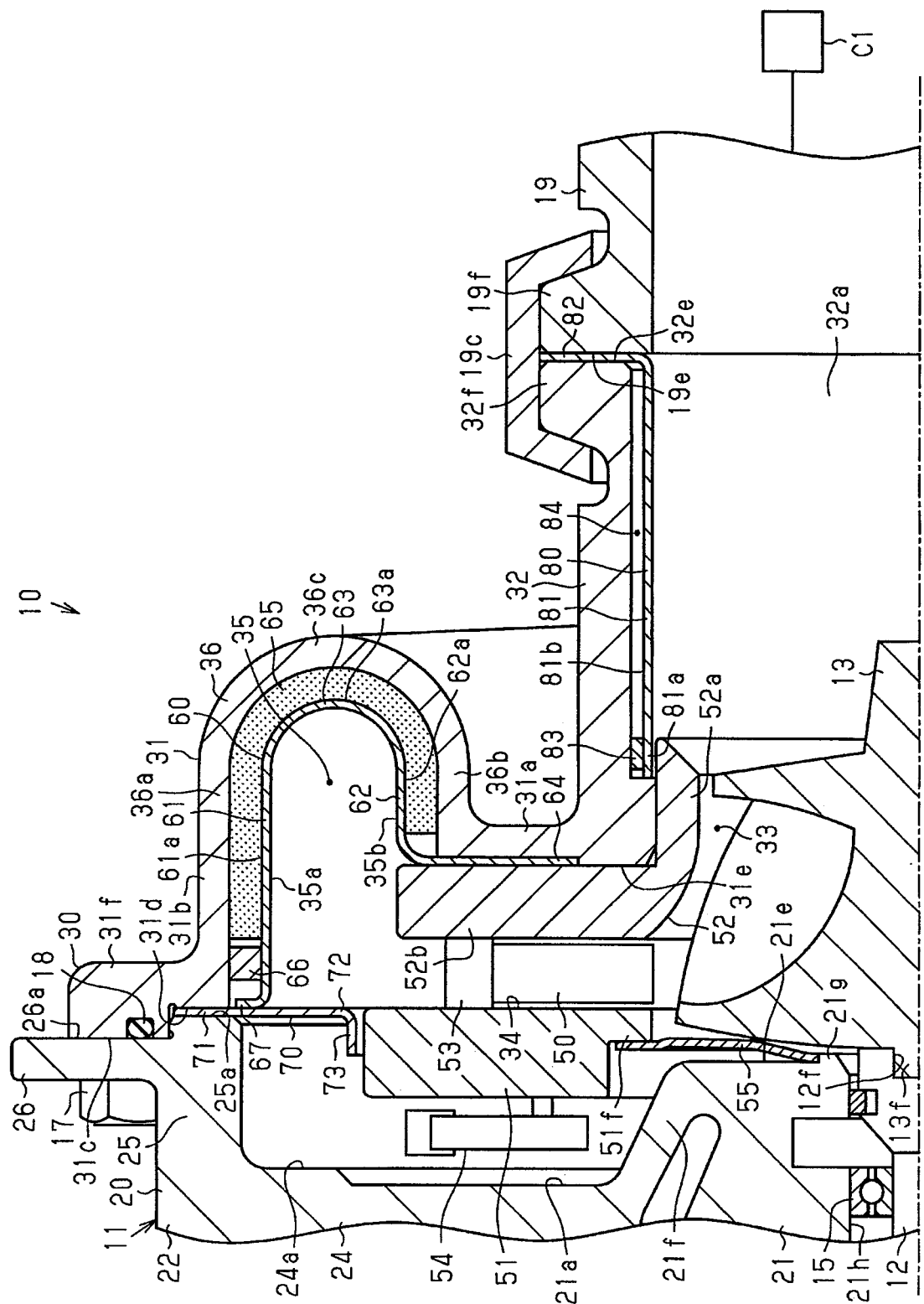
FIG. 2 is an enlarged cross-sectional side view illustrating a part of the turbocharger of FIG. 1.

As shown in FIG. 2, the turbine housing 30 has a turbine main body 31. The turbine main body 31 has a substantially disk-shaped end wall 31a and an annular circumferential wall 31b, which is located radially outward from the end wall 31a and extends in the rotation axis direction of the impeller shaft 12. The end of the circumferential wall 31b on the opposite side from the end wall 31a is open.

The open end of the circumferential wall 31b includes an end face 31d and an annular flange 31f, which protrudes outward in the radial direction of the impeller shaft 12. The flange 31f has an end face 31c on the opposite side from the end wall 31a in the axial direction. The end face 31c protrudes further in the axial direction than the end face 31d of the circumferential wall 31b. The end face 31c of the flange 31f and the end face 31d of the circumferential wall 31b are flat surfaces extending in the radial direction of the impeller shaft 12.

The flange 31f is attached to the third extended portion 26 of the bearing housing 20 by fasteners (for example, bolts 17) with the end face 31c of the flange 31f and the end face 26a of the third extended portion 26 brought into contact with each other, so that the turbine housing 30 is coupled to the first end of the bearing housing 20.

A seal member 18 is provided between the flange 31f and the third extended portion 26 of the bearing housing 20. The seal member 18 seals the interface between the end face 31c of the flange 31f and the end face 26a of the third extended portion 26.

The turbine housing 30 has a turbine tubular portion 32, which protrudes from the end wall 31a. The turbine tubular portion 32 extends away from the circumferential wall 31b. The turbine tubular portion 32 has a discharge port 32a. The discharge 32a extends in the rotation axis direction of the impeller shaft 12. The axis of the discharge port 32a matches the rotation axis of the impeller shaft 12. The turbine tubular portion 32 has, at the open end, a flat open end face 32e, which extends in the radial direction of the impeller shaft 12.

The turbine tubular portion 32 has, at the open end, an annular coupling flange 32f. A downstream exhaust pipe 19, which has a coupling flange 19f and an end face 19e at the open end, is connected to the discharge port 32a. The downstream exhaust pipe 19 is coupled to the turbine tubular portion 32 with the coupling flange 19f and the coupling flange 32f of the turbine tubular portion 32 being clamped by a clamp member 19c. The end face 19e of the downstream exhaust pipe 19 is a flat surface that extends in parallel with the open end face 32e of the turbine tubular portion 32.

The downstream exhaust pipe 19 connects the turbocharger 10 to a catalyst C1, which is provided on the downstream side of the turbine housing 30 in the flowing direction of exhaust gas. The catalyst C1 purifies exhaust gas. When heated to a temperature higher than or equal to the activation temperature, the catalyst C1 exerts exhaust gas purifying capability.

The turbine housing 30 has a turbine chamber 33, a connecting passage 34, and a turbine scroll passage 35. The turbine impeller 13 is accommodated in the turbine chamber 33. The turbine scroll passage 35 spirals around the turbine chamber 33. The turbine scroll passage 35 thus surrounds the circumference of the turbine chamber 33. The turbine scroll passage 35 is a part of the passage that conducts exhaust gas that has flowed into the turbine housing 30 to the turbine chamber 33. The connecting passage 34 extends annularly about the turbine chamber 33 and connects the turbine scroll passage 35 and the turbine chamber 33 to each other.

The turbocharger 10 includes nozzle vanes 50, a first plate 51, and a second plate 52. The nozzle vanes 50 are movable vanes that are capable of changing the flow passage area of the connecting passage 34 and regulates the flow velocity of the exhaust gas conducted to the turbine chamber 33. The nozzle vanes 50 are arranged at intervals in the circumferential direction of the connecting passage 34.

The first plate 51 extends annularly about the protrusion 21f of the bearing housing 20. The first plate 51 is an annular metal support plate that pivotally supports the nozzle vanes 50 and constitutes the wall surface of the connecting passage 34 that is closer to the bearing housing 20. The first plate 51 includes an annular protuberance 51f, which projects inward in the radial direction of the impeller shaft 12 from the inner circumferential surface of the first plate 51. The protuberance 51f is opposed to the protrusion 21f in the rotation axis direction of the impeller shaft 12.

The second plate 52 includes a cylindrical portion 52a, which extends in the axial direction along the inner circumferential surface of the turbine tubular portion 32, and an annular portion 52b, which is continuous with the cylindrical portion 52a and extends radially outward from the cylindrical portion 52a along an inner surface 31e of the end wall 31a. The turbine chamber 33 is a space surrounded by the cylindrical portion 52a of the second plate 52, the protuberance 51f of the first plate 51, and the end face 21e of the protrusion 21f of the bearing housing 20. That is, the second plate 52 is arranged in the turbine housing 30 to constitute a part of the turbine housing 30. The turbine chamber 33 is connected to the discharge port 32a. The exhaust gas that has passed through the turbine chamber 33 is conducted to the discharge port 32a.

The annular portion 52b of the second plate 52 is arranged to be opposed to the first plate 51 in the rotation axis direction of the impeller shaft 12. The second plate 52 is an annular metal plate that cooperates with the first plate 51 to pivotally support the nozzle vanes 50. The annular portion 52b constitutes a wall surface of the connecting passage 34 on the opposite side from the bearing housing 20. The distance between the first plate 51 and the second plate 52 in the rotation axis direction of the impeller shaft 12 is maintained by pillar-shaped spacers 53. The spacers 53 are arranged at intervals in the circumferential direction of the connecting passage 34.

In the rotation axis direction of the impeller shaft 12, a link member 54 for driving the nozzle vanes 50, is arranged between the first plate 51 and the bearing housing 20. The space between the first plate 51 and the bearing housing 20 is a heat insulating air layer.

The turbine impeller 13 has a fitting protuberance 13f, which protrudes toward the insertion hole 21h. The impeller shaft 12 has a fitting recess 12f at a first end in the rotation axis direction. The fitting protuberance 13f can be fitted to the fitting recess 12f. The turbine impeller 13 is attached to the impeller shaft 12, for example, by welding, with the fitting protuberance 13f fitted to the fitting recess 12f of the impeller shaft 12. This allows the turbine impeller 13 to rotate integrally with the impeller shaft 12. The turbine impeller 13 is rotated by exhaust gas drawn into the turbine chamber 33. As the turbine impeller 13 rotates, the impeller shaft 12 rotates integrally.

An annular leaf spring 55 is attached to the protuberance 21g of the protrusion 21f. The outer circumferential edge of the leaf spring 55 is in contact with the end face of the protuberance 51f of the first plate 51 that faces the bearing housing 20. The leaf spring 55 urges the first plate 51 away from the bearing housing 20. Accordingly, the first plate 51, the spacers 53, and the second plate 52 are supported by the end wall 31a while being pressed against the end wall 31a of the turbine main body 31.

The turbine housing 30 has a bulging wall 36, which is located in the outer circumferential portion of the end wall 31a of the turbine main body 31 and bulges away from the bearing housing 20. The bulging wall 36 surrounds the circumference of the turbine tubular portion 32. The bulging wall 36 includes a bulging outer circumferential wall 36a, a bulging inner circumferential wall 36b, and a bulging linking wall 36c. The bulging outer circumferential wall 36a is continuous with the end of the circumferential wall 31b of the turbine main body 31 on the opposite side from the open end and extends in the rotation axis direction of the impeller shaft 12. The bulging inner circumferential wall 36b is located radially inward from the bulging outer circumferential wall 36a and is continuous with the part of the end wall 31a that is radially inward from the impeller shaft 12 with respect to the bulging wall 36. The bulging linking wall 36c is curved to be arcuate so as to project away from the bearing housing 20. The bulging linking wall 36c links the edge of the bulging outer circumferential wall 36a on the side opposite from the bearing housing 20 to the edge of the bulging inner circumferential wall 36b on the side opposite from the bearing housing 20.

The turbocharger 10 includes a scroll passage defining plate 60, which is made of a metal plate that constitutes a part of the wall surface of the turbine scroll passage 35. The scroll passage defining plate 60 is made of a metal sheet, that is, formed through sheet-metal working, and is not formed through casting. The thickness of the scroll passage defining plate 60 is less than the thicknesses of the first plate 51 and the second plate 52. The scroll passage defining plate 60 spirals around the turbine chamber 33. The scroll passage defining plate 60 includes an outer circumferential wall 61, an inner circumferential wall 62, a linking wall 63, and an inner circumferential edge 64.

The outer circumferential wall 61, the inner circumferential wall 62, and the linking wall 63 function as a passage defining portion. The passage defining portion is arranged to have a predetermined clearance from the turbine housing 30 and constitutes a part of the wall surface of the turbine scroll passage 35. A predetermined region in the inner circumferential wall 62 that includes the end continuous with the inner circumferential edge 64 is the inner circumferential edge portion of the passage defining portion. The outer circumferential wall 61 and the inner circumferential wall 62 extend in the rotation axis direction of the impeller shaft 12. The scroll passage defining plate 60 thus has a sufficient stiffness if the scroll passage defining plate 60 includes the linking wall 63 and the inner circumferential edge 64 in addition to the inner circumferential wall 62 and the outer circumferential wall 61, and the linking wall 63 and the inner circumferential edge 64 extend in directions different from those of the inner circumferential wall 62 and the outer circumferential wall 61.

The outer circumferential wall 61 is located inward from the second plate 52 in the radial direction of the impeller shaft 12 to surround the turbine chamber 33 and constitute an outer circumferential interior surface 35a of the turbine scroll passage 35. The outer circumferential wall 61 extends along the inner circumferential surface of the circumferential wall 31b of the turbine main body 31 and the inner circumferential surface of the bulging outer circumferential wall 36a. The outer circumferential surface 61a of the outer circumferential wall 61 is spaced apart from the inner circumferential surface of the inner circumferential surface of the circumferential wall 31b and the inner circumferential surface of the bulging outer circumferential wall 36a.

The inner circumferential wall 62 is located radially inward from the outer circumferential wall 61 and constitutes an inner circumferential interior surface 35b of the turbine scroll passage 35. The inner circumferential wall 62 extends along the inner circumferential surface of the bulging inner circumferential wall 36b. An outer circumferential surface 62a of the inner circumferential wall 62 is spaced apart from the inner circumferential surface of the bulging inner circumferential wall 36b. The inner circumferential surface of the inner circumferential wall 62 constitutes the inner circumferential interior surface 35b of the turbine scroll passage 35. The inner circumferential surface of the inner circumferential wall 62 is located at the same position in the radial direction of the impeller shaft 12 as the outer circumferential edge of the annular portion 52b of the second plate 52. The outer circumferential edge of the annular portion 52b of the second plate 52 may protrude further outward in the radial direction of the impeller shaft 12 than the inner circumferential surface of the inner circumferential wall 62 or may be located inward from the inner circumferential surface of the inner circumferential wall 62 in the radial direction of the impeller shaft 12.

The linking wall 63 links the edge of the outer circumferential wall 61 on the side opposite from the bearing housing 20 to the edge of the inner circumferential wall 62 on the side opposite from the bearing housing 20. The linking wall 63 extends along the inner circumferential surface of the bulging linking wall 36c and is curved to be arcuate so as to project away from the bearing housing 20. An outer circumferential surface 63a of the linking wall 63 is spaced apart from the inner circumferential surface of the bulging linking wall 36c.

The inner circumferential edge 64 extends inward in the radial direction of the impeller shaft 12 from the edge of the inner circumferential wall 62 that is closer to the bearing housing 20. The inner circumferential edge 64 is located, in the rotation axis direction of the impeller shaft 12, between the end wall 31a of the turbine main body 31 and the annular portion 52b of the second plate 52, and extends along the annular portion 52b. The inner circumferential edge 64 is held between the end wall 31a and the annular portion 52b by the urging force of the leaf spring 55. That is, the inner circumferential edge 64 of the scroll passage defining plate 60 is fixed by being held between the turbine housing 30 and the second plate 52. In this manner, the metal plate 52 is used as both of a member that supports the nozzle vanes 50 and a member that holds the inner circumferential edge 64 of the scroll passage defining plate 60.

The turbocharger 10 includes a scroll heat insulator 65. The scroll heat insulator 65 is made of a ceramic material such as alumina and silica fiber. The scroll heat insulator 65 extends over the space between the outer circumferential surface 61a of the outer circumferential wall 61 and the inner circumferential surface of the circumferential wall 31b, the space between the outer circumferential surface 61a of the outer circumferential wall 61 and the inner circumferential surface of the bulging outer circumferential wall 36a, the space between the outer circumferential surface 63a of the linking wall 63, and the space between the outer circumferential surface 62a of the inner circumferential wall 62 and the inner circumferential surface of the bulging inner circumferential wall 36b. The scroll heat insulator 65 is a scroll heat insulating layer that is arranged in a clearance between the passage defining portion of the scroll passage defining plate 60 and the turbine housing 30.

The heat insulating layer provided between the passage defining portion of the scroll passage defining plate 60 (the outer circumferential wall 61, the linking wall 63, and the inner circumferential wall 62) and the turbine housing 30 may be an air layer. To provide an air layer, the outer circumferential wall 61, the linking wall 63, and the inner circumferential wall 62 may be spaced apart from the turbine housing 30 without providing the scroll heat insulator 65. If the contact area between the scroll passage defining plate 60 and the turbine housing 30 is reduced in this manner, the transfer of heat to the turbine housing 30 is limited. Also, the air layer provided inward from the turbine housing 30 functions as space that allows for thermal expansion of the scroll passage defining plate 60.

A scroll elastic member 66 is arranged between the turbine housing 30 and the end of the outer circumferential surface 61a of the outer circumferential wall 61 that is on the opposite side from the linking wall 63. In other words, the scroll elastic member 66 is arranged to provide a clearance between the outer circumferential wall 61 (the passage defining portion of the scroll passage defining plate 60) and the turbine housing 30. The scroll elastic member 66 is located closer to the bearing housing 20 than the scroll heat insulator 65. The scroll elastic member 66 is, for example, an annular wire mesh attached to the outer circumferential surface 61a of the outer circumferential wall 61. The scroll elastic member 66 is provided in a crushed state between the outer circumferential surface 61a of the outer circumferential wall 61 and the circumferential wall 31b of the turbine main body 31.

The scroll elastic member 66 is welded to the outer circumferential surface 61a of the outer circumferential wall 61, for example, by micro spot welding. The outer circumferential wall 61 is thus supported by the turbine housing 30 with the scroll elastic member 66 in between.

The scroll passage defining plate 60 includes an annular flange portion 67, which extends outward in the radial direction of the impeller shaft 12 from the edge of the outer circumferential wall 61 on the side opposite from the linking wall 63. A predetermined region in the outer circumferential wall 61 that includes the end continuous with the flange portion 67 is the outer circumferential edge portion of the passage defining portion. The flange portion 67 extends toward the inner circumferential surface of the circumferential wall 31b of the turbine main body 31 such that a clearance is provided between the flange portion 67 and the inner circumferential surface of the turbine housing 30. Since a clearance is provided between the distal end of the flange portion 67 and the circumferential wall 31b, the flange portion 67 does not contact the circumferential wall 31b.

The turbocharger 10 includes an annular plate 70 made of a metal sheet. The annular plate 70 constitutes a wall surface of the turbine scroll passage 35 that is closer to the bearing housing 20. The annular plate 70 is located radially outward from the turbine impeller 13 in the radial direction of the impeller shaft 12. The annular plate 70 is arranged about the first plate 51. In the rotation axis direction of the impeller shaft 12, the annular plate 70 is arranged to be opposed to the scroll passage defining plate 60, particularly, most of the linking wall 63. The thickness of the annular plate 70 is smaller than the thicknesses of the first plate 51 and the second plate 52.

A heat insulating layer may be provided between the set of the annular plate 70 and the support plate 51 and the set of the end face 24a of the bearing housing 20 and the first end face 21a. The heat insulating layer is, for example, an air layer. Specifically, a space for insulating heat may be provided between the set of the inner circumferential portion of the annular plate 70 and the support plate 51 and the set of the end face 24a of the bearing housing 20 and the first end face 21a. The heat insulating layer limits the transfer of heat from exhaust gas flowing through the turbine scroll passage 35 and the connecting passage 34 to the bearing housing 20.

The flange portion 67 of the scroll passage defining plate 60 extends along the annular plate 70. A clearance may be provided between the flange portion 67 and the annular plate 70. The clearance between the flange portion 67 and the annular plate 70 allows for thermal expansion of the scroll passage defining plate 60.

The turbine scroll passage 35 is provided by the scroll passage defining plate 60, the annular plate 70, the outer circumferential edge of the annular portion 52b of the second plate 52, and the outer circumferential portion of the first plate 51. The outer circumferential portion of the first plate 51 protrudes further outward in the radial direction of the impeller shaft 12 than the outer circumferential edge of the annular portion 52b of the second plate 52.

The annular plate 70 includes an outer circumferential edge 71, which extends between the end face 31d of the circumferential wall 31b and the end face 25a of the second extended portion 25. The outer circumferential edge 71 of the annular plate 70 is held between the end face 31d of the circumferential wall 31b and the end face 25a of the second extended portion 25 by the fastening force of the bolt 17, which is a fastener. That is, the outer circumferential edge 71 of the annular plate 70 is held between the turbine housing 30 and the bearing housing 20.

The annular plate 70 includes a annular rib 73, which protrudes from an inner circumferential portion 72 of the annular plate 70 in the rotation axis direction of the impeller shaft 12. Specifically, the rib 73 extends away from the scroll passage defining plate 60, that is, toward the bearing housing 20. The rib 73 extends along the outer circumferential edge of the first plate 51.

A small clearance may be provided between the inner circumferential surface of the rib 73 and the outer circumferential edge of the first plate 51. In this case, since the rib 73 does not contact the first plate 51, thermal expansion of the annular plate 70 is permitted.

The outer circumferential edge 71 of the annular plate 70 may be defined as a fixed end that is held between the bearing housing 20 and the turbine housing 30. Also, the inner circumferential portion 72 and the rib 73, which are the remainder of the annular plate 70, may be configured not to be fixed to other members. This configuration allows for thermal expansion of the annular plate 70.

The turbocharger 10 includes a tubular discharge port defining member 80, which constitutes the wall surface of the discharge port 32a. The discharge port defining member 80 is made of a metal sheet. The discharge port defining member 80 includes a discharge port main body wall 81, which constitutes the wall surface of the discharge port 32a, and an annular discharge port outer circumferential edge 82, which extends radially outward from an end of the discharge port main body wall 81. The discharge port main body wall 81 is arranged radially inward from the turbine tubular portion 32. The discharge port main body wall 81 has a proximal end 81a, which is closer to the turbine chamber 33, and a distal end, which is on the opposite side from the proximal end 81a. The discharge port outer circumferential edge 82 extends outward in the radial direction of the impeller shaft 12 from the distal end of the discharge port main body wall 81.

The proximal end 81a of the discharge port main body wall 81 may surround the end of the cylindrical portion 52a of the second plate 52 that is on the side opposite from the annular portion 52b. Specifically, the cylindrical portion 52a extends toward the discharge port 32a along the inner circumferential surface of the turbine tubular portion 32. The distal portion of the cylindrical portion 52a is arranged inward from the proximal end 81a of the discharge port main body wall 81 in the radial direction of the turbine housing 30. A clearance may be provided between the proximal end 81a of the discharge port main body wall 81 and the cylindrical portion 52a. If the proximal end 81a of the discharge port main body wall 81 is spaced apart from the turbine housing 30 and the cylindrical portion 52a, thermal expansion of the discharge port main body wall 81 is permitted.

A discharge port elastic member 83 is arranged between the discharge port main body wall 81 and the turbine housing 30, for example, between the proximal end 81a and the inner circumferential surface of the turbine tubular portion 32. The discharge port elastic member 83, for example, an annular wire mesh attached to an outer circumferential surface 81b of the discharge port main body wall 81. The elastic member 83 may be arranged to be closer to the proximal end 81a of the discharge port main body wall 81 than the distal end.

The discharge port elastic member 83 is provided in a crushed state between the outer circumferential surface 81b of the discharge port main body wall 81 and the inner circumferential surface of the turbine tubular portion 32. The discharge port elastic member 83 is welded to the outer circumferential surface 81b of the discharge port main body wall 81, for example, by micro spot welding. The discharge port main body wall 81 is thus supported by the turbine tubular portion 32 with the discharge port elastic member 83 in between. If the discharge port main body wall 81 is not fixed using the elastic member 83, the proximal end 81a of the discharge port main body wall 81 is a free end that is not fixed to another member.

The discharge port outer circumferential edge 82 protrudes from the opening of the turbine tubular portion 32 and extends along the open end face 32e of the turbine tubular portion 32. The discharge port outer circumferential edge 82 is held between the open end face 32e of the turbine tubular portion 32 and the end face 19e of the downstream exhaust pipe 19 by the fastening force of the clamp member 19c. That is, the discharge port outer circumferential edge 82 is fixed between the turbine housing 30 and the downstream exhaust pipe 19.

The discharge port defining member 80 may be arranged in the turbine housing 30 with the proximal end 81a of the discharge port main body wall 81 being spaced apart from the inner circumferential surface of the turbine housing 30. The space between the discharge port main body wall 81 and the inner circumferential surface of the turbine housing 30 allows for thermal expansion of the discharge port defining member 80. This space is a discharge port air layer 84, which is provided between the outer circumferential surface 81b of the discharge port main body wall 81 and the inner circumferential surface of the turbine tubular portion 32. The discharge port air layer 84 is a discharge port heat insulating layer provided between the discharge port defining member 80 and the turbine housing 30. In this manner, the discharge port defining member 80 may be arranged such that a predetermined clearance exists between the discharge port defining member 80 and the inner circumferential surface of the turbine housing 30 such that a heat insulating layer is provided between the discharge port main body wall 81 and the turbine housing 30. The heat insulating layer limits the transfer of heat from the exhaust gas to the turbine housing 30. The configuration thus limits the temperature reduction in the exhaust gas flowing through the turbine scroll passage 35.

Figure 3:
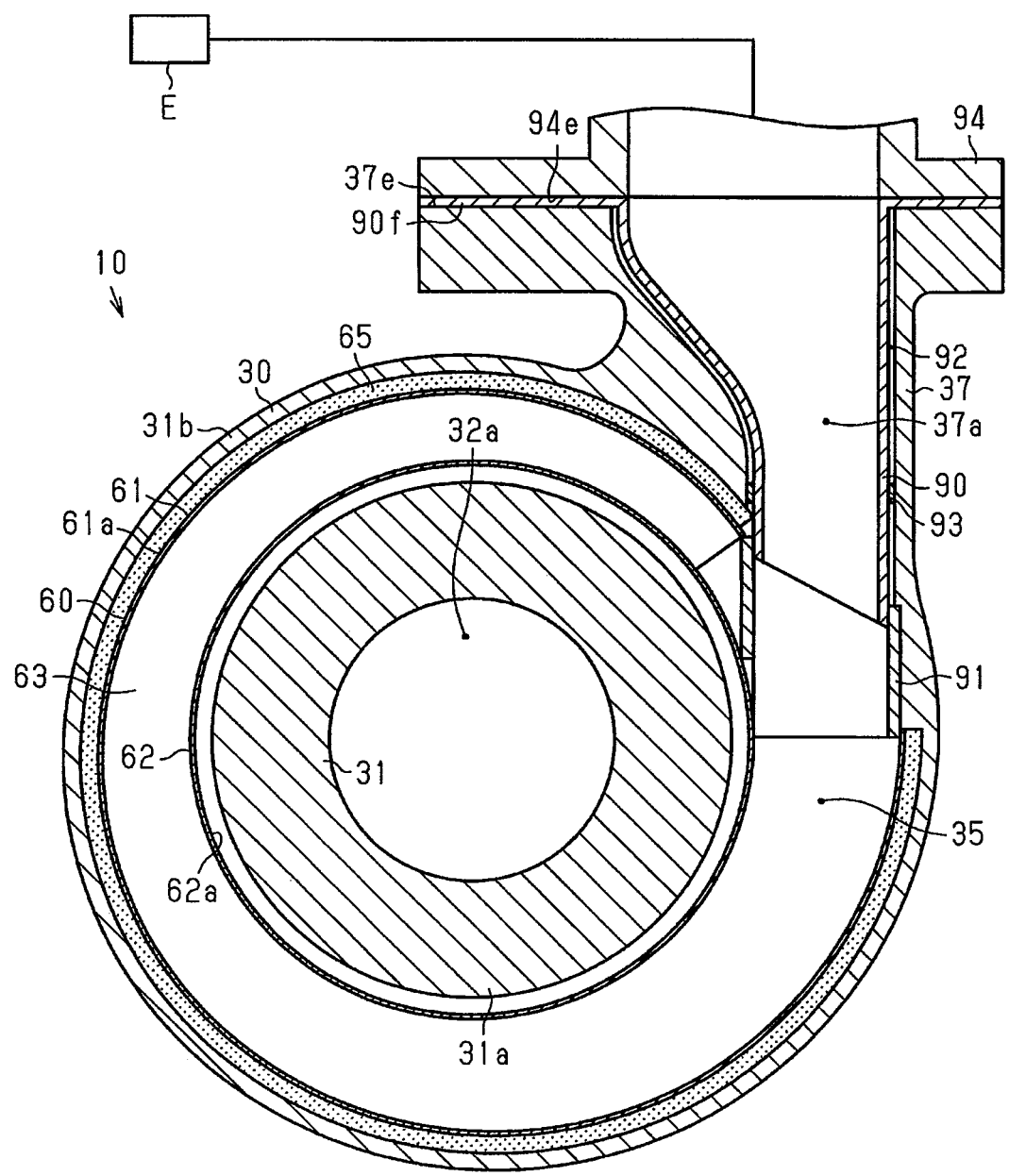
FIG. 3 is a vertical cross-sectional view illustrating the turbocharger of FIG. 1.

As shown in FIG. 3, the turbocharger 10 includes an intake port 37a, which conducts exhaust gas discharged from the internal combustion engine E to the turbine scroll passage 35. The turbine housing 30 has an intake port defining protrusion 37, which protrudes from the outer circumferential surface of the turbine housing 30. For the illustrative purposes, the second plate 52 and the turbine impeller 13 are not illustrated in FIG. 3. The intake port 37a is provided inward from the intake port defining protrusion 37. The intake port 37a is thus provided in the turbine housing 30.

The turbocharger 10 includes a tubular intake port defining member 90, which constitutes the wall surface of the intake port 37a. The intake port defining member 90 is made of a metal sheet. The intake port defining member 90 is inserted into the intake port defining protrusion 37. The end of the intake port defining member 90 that is closer to the turbine scroll passage 35 is connected to the scroll passage defining plate 60 via a tubular connecting member 91. The inner space of the intake port defining member 90 and the inner space of the scroll passage defining plate 60 are continuous with each other via the inner space of the connecting member 91. Thus, the intake port 37a and the turbine scroll passage 35 are continuous with each other via the inner space of the connecting member 91.

The turbocharger 10 includes an intake port air layer 92, which is provided between the outer circumferential surface of the intake port defining member 90 and the inner circumferential surface of the intake port defining protrusion 37. The intake port air layer 92 is thus an intake port heat insulating layer provided between the intake port defining member 90 and the turbine housing 30.

An intake port elastic member 93 is arranged between the outer circumferential surface of the intake port defining member 90 and the inner circumferential surface of the intake port defining protrusion 37. The intake port elastic member 93 may be located in a part of the intake port defining member 90 that is close to the turbine scroll passage 35.

The intake port elastic member 93 is, for example, an annular wire mesh attached to the outer circumferential surface of the intake port defining member 90. Since the wire mesh allows for passage of air, pressure difference is not easily created between the intake port air layer 92 and the intake port 37a. This limits deformation of the intake port defining member 90 caused by the pressure difference.

The intake port elastic member 93 is provided in a crushed state between the outer circumferential surface of the intake port defining member 90 and the inner circumferential surface of the intake port defining protrusion 37. The intake port elastic member 93 is welded to the outer circumferential surface of the intake port defining member 90, for example, by micro spot welding. The intake port defining member 90 is thus supported by the turbine housing 30 with the intake port elastic member 93 in between.

The intake port defining member 90 includes an annular intake port outer circumferential edge 90f, which protrudes from the intake port defining protrusion 37 and extends along an open end face 37e of the intake port defining protrusion 37. The intake port outer circumferential edge 90f is held between an end face 94e of an upstream exhaust pipe 94 connected to the intake port 37a and the open end face 37e of the intake port defining protrusion 37. That is, the intake port outer circumferential edge 90f is held between the turbine housing 30 and the upstream exhaust pipe 94. The intake port outer circumferential edge 90f is held between the end face 94e of the upstream exhaust pipe 94 and the open end face 37e of the intake port defining protrusion 37 by fastening force of a bolt (not shown) that fastens the upstream exhaust pipe 94 and the intake port defining protrusion 37 together.

The operation of the present embodiment will now be described.

Exhaust gas discharged from the internal combustion engine E is conducted to the turbine scroll passage 35 via the intake port 37a. When the exhaust gas flows through the intake port 37a, the intake port defining member 90 limits the transfer of heat from the exhaust gas to the turbine housing 30. The intake port air layer 92 limits the transfer of heat from the intake port defining member 90 to the turbine housing 30.

The exhaust gas conducted to the turbine scroll passage 35 is then conducted to the turbine chamber 33 via the connecting passage 34. When the exhaust gas flows through the turbine scroll passage 35, the scroll passage defining plate 60 and the annular plate 70 limit the transfer of heat from the exhaust gas to the turbine housing 30. The scroll heat insulator 65 limits the transfer of heat from the scroll passage defining plate 60 to the turbine housing 30.

When the exhaust gas is drawn into the turbine chamber 33, the turbine impeller 13 is rotated by receiving the flow of the exhaust gas drawn into the turbine chamber 33. As the turbine impeller 13 rotates, the compressor impeller 14 is rotated integrally with the turbine impeller 13 through the impeller shaft 12. When the compressor impeller 14 rotates, the intake air drawn into the compressor impeller chamber 43 through the intake port 42a is compressed by rotation of the compressor impeller 14. The velocity of the intake air is then reduced when passing through the diffuser passage 44.

This converts the velocity energy of the intake air into pressure energy. The intake air, the pressure of which has been increased, is discharged to the compressor scroll passage 45 to be supplied to the internal combustion engine E. Such forced-induction of the intake air into the internal combustion engine E is performed by the turbocharger 10 to increase the charging efficiency of the internal combustion engine E. This improves the performance of the internal combustion engine E.

The exhaust gas that has passed through the turbine chamber 33 is conducted to the discharge port 32*a* and then flows into the downstream exhaust pipe 19 via the discharge port 32*a*. When the exhaust gas flows through the discharge port 32*a*, the discharge port defining member 80 limits the transfer of heat from the exhaust gas to the turbine housing 30. The discharge port air layer 84 limits the transfer of heat from the discharge port defining member 80 to the turbine housing 30.

The exhaust gas that has flowed into the downstream exhaust pipe 19 from the discharge port 32*a* reaches the catalyst C1 after passing through the downstream exhaust pipe 19. The intake port defining member 90, the scroll passage defining plate 60, the annular plate 70, and the discharge port defining member 80 limit the transfer of heat from the exhaust gas to the turbine housing 30. Thus, the heat of the exhaust gas flowing through the turbine housing 30 is not easily removed, so that the temperature of the exhaust gas is not easily reduced. This shortens the time for the catalyst C1 to reach the activation temperature. Therefore, for example, under the operating condition in which there is a demand for early warm-up of the catalyst C1, for example, during cold start of the internal combustion engine E, the catalyst C1 is readily heated to a temperature higher than or equal to the activation temperature at an early stage.

The above described embodiment has the following advantages.

(1) The scroll elastic member 66 is arranged between the turbine housing 30 and the end of the outer circumferential surface 61*a* of the outer circumferential wall 61 of the scroll passage defining plate 60 that is on the opposite side from the linking wall 63. The outer circumferential wall 61 of the scroll passage defining plate 60 is thus movable relative to the turbine housing 30. Elastic deformation of the scroll elastic member 66 allows for thermal expansion of the scroll passage defining plate 60 caused by heating of the scroll passage defining plate 60 by the heat of exhaust gas. Also, the outer circumferential wall 61 of the scroll passage defining plate 60 is supported by the turbine housing 30 with the scroll elastic member 66, and the inner circumferential edge 64 of the scroll passage defining plate 60 is held between the turbine housing 30 and the second plate 52. This suppresses vibrations of the scroll passage defining plate 60. The present embodiment thus allows for thermal expansion of the scroll passage defining plate 60, while suppressing vibrations of the scroll passage defining plate 60.

(2) The flange portion 67 of the scroll passage defining plate 60 limits entry of exhaust gas flowing through the turbine scroll passage 35 into the gap between the scroll passage defining plate 60 and the turbine housing 30 through the gap between the edge of the outer circumferential wall 61 of the scroll passage defining plate 60 and the turbine housing 30. This allows transfer of heat from the exhaust gas flowing through the turbine scroll passage 35 to the turbine housing 30 to be easily limited.

(3) The turbocharger 10 further includes the annular plate 70, which is made of a metal sheet and constitutes the wall surface of the turbine scroll passage 35 that is closer to the bearing housing 20. In the rotation axis direction of the impeller shaft 12, the annular plate 70 is arranged to be opposed to the linking wall 63 of the scroll passage defining plate 60. The thickness of the annular plate 70 is smaller than the thicknesses of the first plate 51 and the second plate 52, and the outer circumferential edge 71 of the annular plate 70 is held between the turbine housing 30 and the bearing housing 20. This configuration effectively limits the reduction in the temperature of the exhaust gas flowing through the turbine scroll passage 35 as compared to a comparative example in which, for example, a part of the first plate 51 is arranged, in the rotation axis direction of the impeller shaft 12, to be opposed to most of the linking wall 63 of the scroll passage defining plate 60, and a part of the first plate 51 constitutes the wall surface of the turbine scroll passage 35 that is closer to the bearing housing 20.

(4) The annular plate 70 includes the annular rib 73, which protrudes from the inner circumferential portion 72 of the annular plate 70 in the rotation axis direction of the impeller shaft 12. Specifically, the rib 73 protrudes away from the scroll passage defining plate 60. The rib 73 increases the stiffness of the annular plate 70. Also, vibrations in a section close to the inner circumferential portion 72 of the annular plate 70 are more suppressed than in a case in which the annular plate 70 does not have the rib 73.

(5) The turbocharger 10 further includes the tubular discharge port defining member 80, which constitutes the wall surface of the discharge port 32*a*. The discharge port defining member 80 is made of a metal sheet. The discharge port defining member 80 limits the transfer of heat from exhaust gas to the turbine housing 30. Thus, the temperature of the exhaust gas is prevented from being reduced when flowing through the discharge port 32*a*. Further, the discharge port elastic member 83 is arranged between the turbine housing 30 and the end of the outer circumferential surface 81*b* of the discharge port main body wall 81 of the discharge port defining member 80 that is closer to the turbine chamber 33. Elastic deformation of the discharge port elastic member 83 allows for thermal expansion of the discharge port defining member 80 that is caused when the discharge port defining member 80 is warmed by the heat of the exhaust gas. Also, the discharge port main body wall 81 is supported by the turbine housing 30 with the discharge port elastic member 83, and the discharge port outer circumferential edge 82 of the discharge port defining member 80 is held between the turbine housing 30 and the downstream exhaust pipe 19. This suppresses vibrations of the discharge port defining member 80. The present embodiment thus allows for thermal expansion of the discharge port defining member 80, while suppressing vibrations of the discharge port defining member 80.

(6) The turbocharger 10 further includes the tubular intake port defining member 90, which constitutes the wall surface of the intake port 37*a*. The intake port defining member 90 is made of a metal sheet. The intake port defining member 90 limits the transfer of heat from exhaust gas to the turbine housing 30. Thus, the temperature of the exhaust gas is prevented from being reduced when flowing through the intake port 37*a*.

(7) A part of the wall surface of the turbine scroll passage 35 is constituted by the scroll passage defining plate 60, which is made of a metal sheet, and the annular plate 70. The wall surface of the discharge port 32*a* is constituted by the discharge port defining member 80, which is made of a metal sheet. The wall surface of the intake port 37*a* is constituted by the intake port defining member 90, which is made of a metal sheet. This configuration reduces the thermal stress of the turbine housing 30. Accordingly, the reliability and the durability of the turbine housing 30 are improved.

(8) A part of the wall surface of the turbine scroll passage 35 is constituted by the annular plate 70 and the scroll passage defining plate 60, which is made of a metal sheet. This configuration reduces the resistance of the wall surface against the exhaust gas flowing through the turbine scroll passage 35 as compared to a configuration in which the wall surface of the turbine scroll passage 35 is a casting surface of the turbine housing 30.

(9) The wall surface of the discharge port 32a is constituted by the discharge port defining member 80, which is made of a metal sheet. This configuration reduces the resistance of the wall surface against the exhaust gas flowing through the discharge port 32a as compared to a configuration in which the wall surface of the discharge port 32a is a casting surface of the turbine housing 30.

(10) The wall surface of the intake port 37a is constituted by the intake port defining member 90, which is made of a metal sheet. This configuration reduces the resistance of the wall surface against the exhaust gas flowing through the intake port 37a as compared to a configuration in which the wall surface of the intake port 37a is a casting surface of the turbine housing 30.

(11) The intake port defining member 90, the scroll passage defining plate 60, the annular plate 70, and the discharge port defining member 80 limit the transfer of heat from the exhaust gas to the turbine housing 30. Thus, the heat of the exhaust gas flowing through the turbine housing 30 is not easily removed, so that the temperature of the exhaust gas is not easily reduced. This shortens the time for the catalyst C1 to reach the activation temperature. Therefore, for example, under the operating condition in which there is a demand for early warm-up of the catalyst C1, for example, during cold start of the internal combustion engine E, the catalyst C1 is heated to a temperature higher than or equal to the activation temperature at an early stage.

(12) The intake port elastic member 93 is arranged between a section in the outer circumferential surface of the intake port defining member 90 that is close to the turbine scroll passage 35 and the inner circumferential surface of the intake port defining protrusion 37. Elastic deformation of the intake port elastic member 93 allows for thermal expansion of the intake port defining member 90 that is caused when the intake port defining member 90 is warmed by the heat of the exhaust gas. Also, the intake port defining member 90 is supported by the turbine housing 30 with the intake port elastic member 93, and the intake port outer circumferential edge 90f of the intake port defining member 90 is held between the turbine housing 30 and the upstream exhaust pipe 94. This suppresses vibrations of the intake port defining member 90. The present embodiment thus allows for thermal expansion of the intake port defining member 90, while suppressing vibrations of the intake port defining member 90.

The above-described embodiment may be modified as follows. The features included in the above-described embodiment and the features included in the following modifications can be combined as needed. The features in the following modifications can be combined as needed.

In the above-described embodiment, the turbocharger 10 does not necessarily need to include the intake port defining member 90. The wall surface of the intake port 37a may be constituted by a casting surface of the turbine housing 30.

In the above-described embodiment, the turbocharger 10 does not necessarily need to include the discharge port defining member 80. The wall surface of the discharge port 32a may be constituted by a casting surface of the turbine housing 30.

In the above-described embodiment, the turbocharger 10 does not necessarily need to include the annular plate 70. For example, a part of the first plate 51 may be arranged, in the rotation axis direction of the impeller shaft 12, to be opposed to most of the linking wall 63 of the scroll passage defining plate 60, and a part of the first plate 51 may constitute the wall surface of the turbine scroll passage 35 that is closer to the bearing housing 20.

In the above-described embodiment, the annular plate 70 does not necessarily need to include the annular rib 73, which protrudes from the inner circumferential portion 72 and extends away from the linking wall 63.

In the above-described embodiment, the scroll passage defining plate 60 does not necessarily include the flange portion 67, which extends outward in the radial direction of the impeller shaft 12 from the edge of the outer circumferential wall 61 on the side opposite from the linking wall 63.

In the above-described embodiment, the turbocharger 10 does not necessarily need to include the scroll heat insulator 65. For example, the turbocharger 10 may include an air layer that extends over the space between the outer circumferential surface 61a of the outer circumferential wall 61 and the inner circumferential surface of the circumferential wall 31b, the space between the outer circumferential surface 61a of the outer circumferential wall 61 and the inner circumferential surface of the bulging outer circumferential wall 36a, the space between the outer circumferential surface 63a of the linking wall 63, and the space between the outer circumferential surface 62a of the inner circumferential wall 62 and the inner circumferential surface of the bulging inner circumferential wall 36b. In short, the turbocharger 10 simply needs to include a scroll heat insulating layer provided between the scroll passage defining plate 60 and the turbine housing 30.

In the above-described embodiment, the turbocharger 10 may include a discharge port heat insulator between the outer circumferential surface 81b of the discharge port main body wall 81 and the inner circumferential surface of the turbine tubular portion 32. In short, the turbocharger 10 simply needs to include a discharge port heat insulating layer provided between the discharge port defining member 80 and the turbine housing 30.

In the above-described embodiment, the turbocharger 10 may include an intake port heat insulator between the intake port defining member 90 and the turbine housing 30. In short, the turbocharger 10 simply needs to include an intake port heat insulating layer provided between the intake port defining member 90 and the turbine housing 30.

In the above-described embodiment, the scroll passage defining plate 60 and the connecting member 91 may be integrated.

The nozzle vanes 50 may be fixed vanes fixed to the first plate 51 or the second plate 52. For example, as in a first modification illustrated in FIG. 4, fixed vanes may be fixed to the first plate 51. When the nozzle vanes 50 are fixed vanes, one of the plates 51, 52 that does not support the fixed vanes, the spacers 53, and the link member 54 may be omitted. Thus, if the nozzle vanes 50 are fixed vanes, the number of components is reduced. The nozzle vanes 50, that is, fixed vanes and movable vanes, are arranged in the connecting passage 34 to cause exhaust gas in the turbine scroll passage 35 to flow to the turbine chamber 33.

Figure 4:
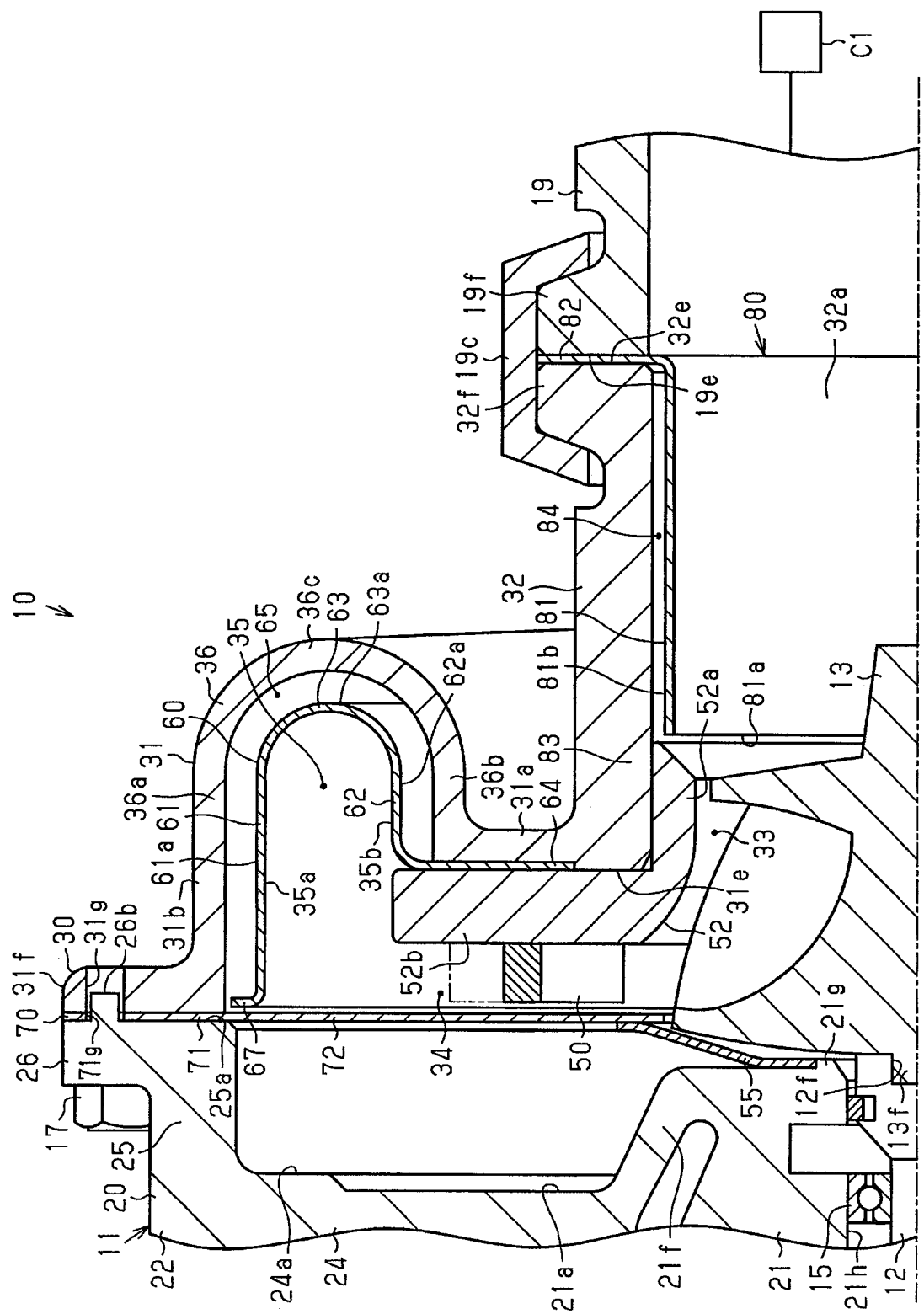
FIG. 4 is an enlarged cross-sectional side view illustrating a part of a turbocharger according to a first modification.

When fixed vanes are fixed to the second plate 52 as shown in FIG. 4, the flow passage defining portion, which is a part of the annular plate 70 that defines the turbine scroll passage 35, may be extended to a position that is opposed to the metal plate 52 (the second plate 52). In this case, the annular plate 70 defines the connecting passage 34. If the connecting passage 34 is defined by the metal annular plate 70, the transfer of heat from exhaust gas flowing through the connecting passage 34 to the bearing housing 20 is limited. Further, the inner circumferential edge of the annular plate 70 may be engaged with the leaf spring 55 so as to support the passage defining portion of the annular plate 70.

Figure 5:
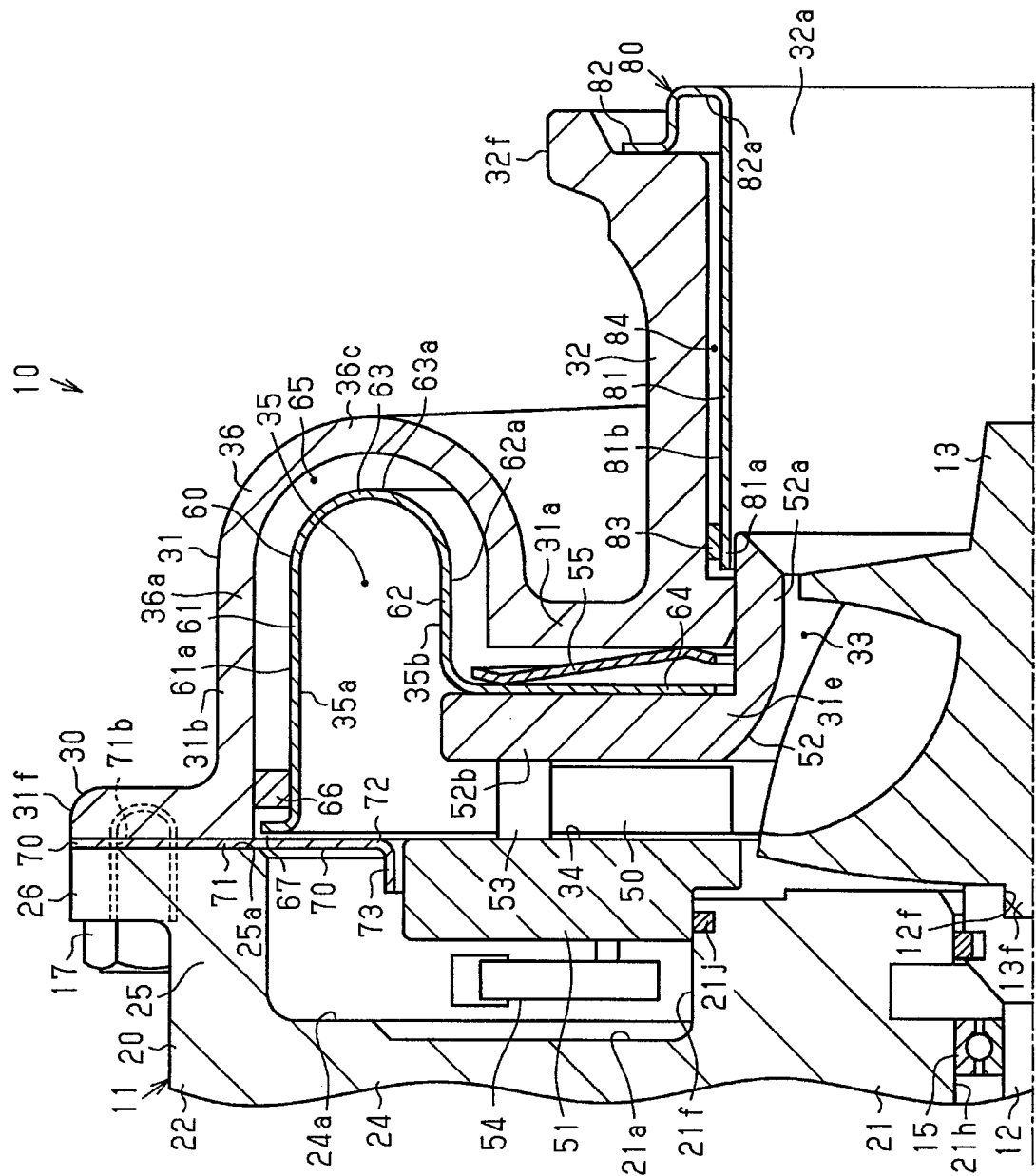
FIG. 5 is an enlarged cross-sectional side view illustrating a part of a turbocharger according to a second modification.

As shown in FIGS. 4 and 5, the outer circumferential edge 71 of the annular plate 70 may extend to a position between the end face 31c of the flange 31f and the end face 26a of the third extended portion 26 of the bearing housing 20, such that the annular plate 70 seals the interface between the bearing housing 20 and the turbine housing 30. In this case, the outer circumferential edge 71 of the annular plate 70 functions as a gasket portion that is held between the bearing housing 20 and the turbine housing 30 so as to seal the interface between the bearing housing 20 and the turbine housing 30. This eliminates the necessity for the seal member 18, reducing the number of components. In the configuration of FIGS. 1 and 2, the outer circumferential edge 71 of the annular plate 70 may be extended such that the annular plate 70 seals the interface between the bearing housing 20 and the turbine housing 30 as shown in FIGS. 4 and 5.

As shown in FIG. 4, the third extended portion 26 of the bearing housing 20 may have a positioning projection 26b, and the annular plate 70 and the flange 31f may respectively have positioning through-holes 71a, 31g for receiving the projection 26b. This facilitates the assembly of the bearing housing 20, the annular plate 70, and the turbine housing 30.

In the configuration of FIGS. 1 and 2, the scroll elastic member 66 may be omitted as shown in FIG. 4, and the outer circumferential wall 61 does not necessarily need to be fixed to the turbine housing 30. For example, the scroll passage defining plate 60 may be configured such that only the inner circumferential edge 64 is fixed to the turbine housing 30, and the remaining portion (the passage defining portion) is not fixed to or supported by the turbine housing 30. In this case, the outer circumferential wall 61, particularly the outer circumferential edge portion of the passage defining portion, is spaced apart from the inner circumferential surface of the turbine housing 30, the distal end of the outer circumferential wall 61 (the end on the side opposite from the linking wall 63) is a free end that is not fixed to another member. That is, the scroll passage defining plate 60 is arranged in the turbine housing 30 such that the inner circumferential edge 64 is fixed between the turbine housing 30 and the metal plate 52, and the outer circumferential edge portion of the passage defining portion is movable relative to the turbine housing 30. This allows for thermal expansion of the scroll passage defining plate 60 due to heating of the scroll passage defining plate 60 the heat of the exhaust gas.

In the configuration of FIGS. 1 and 2, the discharge port elastic member 83 does not necessarily need to be provided between the discharge port defining member 80 and the turbine housing 30 as shown in FIG. 4.

As shown in FIG. 4, the proximal end 81a of the discharge port defining member 80 may be spaced apart from the cylindrical portion 52a of the second plate 52 in the rotation axis direction of the impeller shaft 12. This allows for thermal expansion of the discharge port main body wall 81.

As in a second modification illustrated in FIG. 4, when the bearing housing 20 and the turbine housing 30 are fixed to each other by a fastener (the bolt 17), the annular plate 70 may have an insertion hole (a bolt hole 71b), through which the fastener (the bolt 17) is passed, in addition to the insertion holes (the bolt holes) of the bearing housing 20 and the turbine housing 30, through which the fastener is passed. In this case, the bolt 17 may also be passed through the annular plate 70 to fasten the bearing housing 20, the annular plate 70, and the turbine housing 30 together. This properly seal the interface between the bearing housing 20 and the annular plate 70 and the interface between the annular plate 70 and the turbine housing 30.

In the configuration of FIGS. 1 and 2, the annular leaf spring 55 may be arranged between the inner circumferential edge 64 of the scroll passage defining plate 60 and the end wall 31a of the turbine housing 30 as illustrated in FIG. 5. When the leaf spring 55 is arranged between the inner circumferential edge 64 and the turbine housing 30, the scroll passage defining plate 60 is fixed by holding the inner circumferential edge 64 between the leaf spring 55 and the metal plate 52. This reduces the contact area between the turbine housing 30 and the scroll passage defining plate 60. This limits the transfer of heat from the exhaust gas flowing through the turbine scroll passage 35 to the turbine housing 30.

In this case, the inner circumferential edge of the leaf spring 55 may be brought into contact with the turbine housing 30, and the outer circumferential edge of the leaf spring 55 may be brought into contact with the scroll passage defining plate 60. Alternatively, the outer circumferential edge of the leaf spring 55 may be brought into contact with the turbine housing 30, and the inner circumferential edge of the leaf spring 55 may be brought into contact with the scroll passage defining plate 60. Also, the interface between the protrusion 21f of the bearing housing 20 and the first plate 51 may be sealed by a seal member 21j.

As shown in FIG. 5, a clearance may be provided between the proximal end 81a of the discharge port defining member 80 and the turbine housing 30, and a clearance may be provided between the proximal end 81a of the discharge port defining member 80 and the cylindrical portion 52a. This connects the discharge port air layer 84 and the discharge port air layer 84 to each other, so that a pressure difference is unlikely to be caused between the discharge port air layer 84 and the discharge port 32a. This limits deformation of the discharge port defining member 80 caused by the pressure difference.

Further, the cylindrical portion 52a may be arranged inward from the proximal end 81a of the discharge port main body wall 81, and a clearance may be provided between the proximal end 81a of the discharge port main body wall 81 and the cylindrical portion 52a. This hinders entry of the air flowing from the discharge port 32a to the turbine scroll passage 35 into the discharge port air layer 84. This limits the transfer of heat from the exhaust gas to the turbine housing 30.

As shown in FIG. 5, the discharge port defining member 80 may has a fold-back portion 82a, which is a bent portion, between the discharge port main body wall 81 and the discharge port outer circumferential edge 82. This configuration reduces the contact area between the discharge port outer circumferential edge 82 and the turbine housing 30. As a result, the transfer of heat from the discharge port defining member 80 to the turbine housing 30 is limited.

Figure 6:
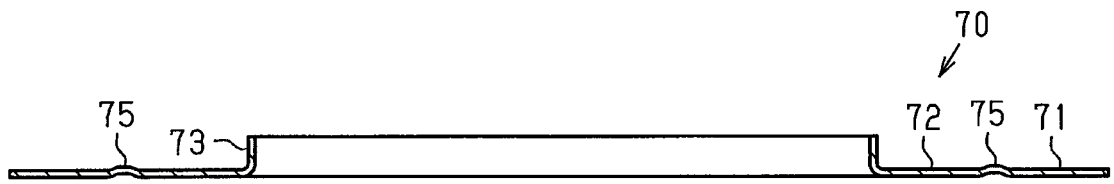
FIG. 6 is a cross-sectional view of the annular plate of the turbocharger of FIG. 1.
Figure 7:
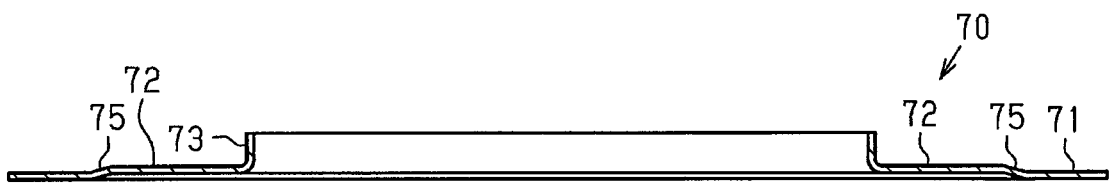
FIG. 7 is a cross-sectional view illustrating a modification of the annular plate of FIG. 6.

As shown in FIGS. 6 and 7, the annular plate 70 may include a bead 75 arranged between the bearing housing 20 and the turbine housing 30. In this case, even if the shape of the annular plate 70 has distortion, the bead 75 is crushed when the bearing housing 20 and the turbine housing 30 are fastened together, so that the interface between the bearing housing 20 and the turbine housing 30 is properly sealed. The bead 75 may be a full bead, which protrude in one direction, or a half-bead, which includes a step portion as shown in FIG. 7. The bead in the gasket portion (the outer circumferential edge 71) of the annular plate 70 may be annular as shown in FIGS. 6 and 7. Alternatively, the bead may be constituted by protuberances or recesses arranged at predetermined intervals.

In the configuration of FIG. 3, a scroll heat insulator does not necessarily need to be provided between the scroll passage defining plate 60 and the turbine housing 30. Instead, a heat insulating layer, which is an air layer 65, may be provided. In this case, a clearance may be provided between the open end of the scroll passage defining plate 60 and the turbine housing 30, such that the clearance connects the turbine scroll passage 35 and the air layer 65 to each other. This configuration is unlikely to cause a pressure difference between the air layer 65 and the turbine scroll passage 35. This limits deformation of the scroll passage defining plate 60 caused by the pressure difference.

Figure 8:
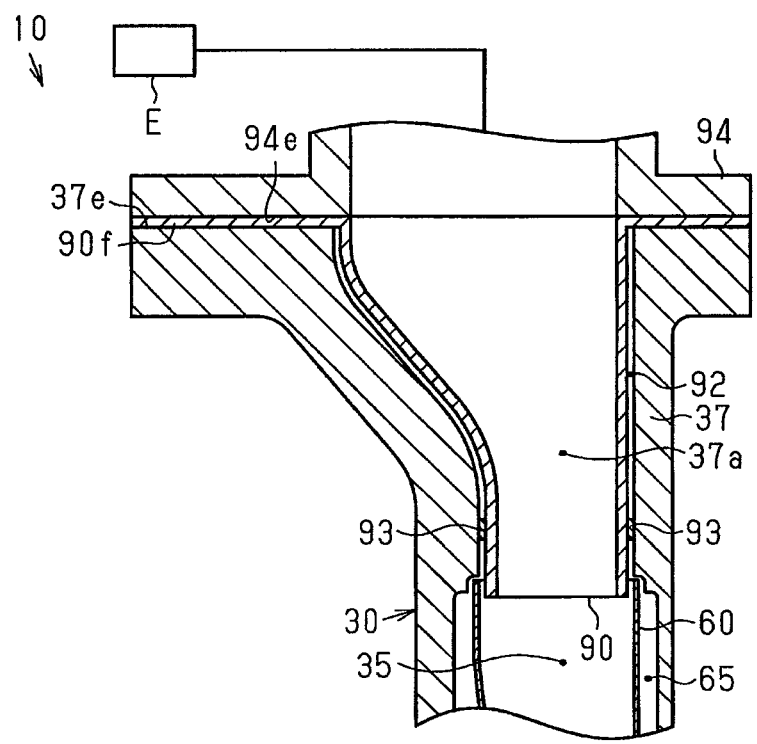
FIG. 8 is a cross-sectional view illustrating a partial modification of the turbocharger of FIG. 3.

In the configuration shown in FIG. 3, the connecting member 91 does not necessarily need to be provided between the intake port defining member 90 and the scroll passage defining plate 60. In this case, as illustrated in FIG. 8, an end of the intake port defining member 90 may be inserted slightly into the opening of the scroll passage defining plate 60. In this configuration, although the air layer 65 and the scroll passage defining plate 60 are connected with each other, air flow that flows from the intake port 37a to the turbine scroll passage 35 is unlikely to flow into the air layer 65. This limits the transfer of heat from the exhaust gas to the turbine housing 30.

The intake port elastic member 93 shown in FIGS. 3 and 8 may be omitted.

The invention claimed is:

1. A turbocharger comprising:
a bearing housing that rotationally supports an impeller shaft;
a turbine housing that is a cast component coupled to an end of the bearing housing in a rotation axis direction of the impeller shaft, wherein exhaust gas discharged from an internal combustion engine flows inside the turbine housing;
a turbine chamber defined in the turbine housing;
a turbine impeller that is accommodated in the turbine chamber and is configured to be rotated integrally with the impeller shaft by exhaust gas drawn into the turbine chamber;
a turbine scroll passage that is defined in the turbine housing and is a part of a passage for conducting exhaust gas that has flowed into the turbine housing to the turbine chamber, the turbine scroll passage surrounding a circumference of the turbine chamber;
a connecting passage that is defined in the turbine housing and connects the turbine scroll passage and the turbine chamber to each other;
an annular metal plate that constitutes a part of a wall surface of the connecting passage; and
a scroll passage defining plate that includes
a passage defining portion that is arranged such that a predetermined clearance is provided between the passage defining portion and the turbine housing, the passage defining portion constituting a part of a wall surface of the turbine scroll passage, and
an inner circumferential edge that extends from an inner circumferential edge portion of the passage defining portion and along the metal plate, wherein the scroll passage defining plate is arranged in the turbine housing such that
the inner circumferential edge is fixed between the turbine housing and the metal plate, and
an outer circumferential edge portion of the passage defining portion that is on a side opposite from the inner circumferential edge portion is movable relative to the turbine housing.

2. The turbocharger according to claim 1, wherein the scroll passage defining plate is arranged in the turbine housing such that the outer circumferential edge portion of the passage defining portion and an inner circumferential surface of the turbine housing are spaced apart from each other.

3. The turbocharger according to claim 1, further comprising an elastic member configured to provide a clearance between the passage defining portion of the scroll passage defining plate and the turbine housing.

4. The turbocharger according to claim 3, wherein
the elastic member is arranged between the outer circumferential edge portion of the passage defining portion and the turbine housing, and
the outer circumferential edge portion of the passage defining portion is supported by the turbine housing with the elastic member in between.

5. The turbocharger according to claim 1, further comprising an annular leaf spring that is arranged between the inner circumferential edge of the scroll passage defining plate and the turbine housing,
wherein the scroll passage defining plate is fixed by holding the inner circumferential edge between the leaf spring and the metal plate.

6. The turbocharger according to claim 1, wherein the scroll passage defining plate is fixed by holding the inner circumferential edge between the turbine housing and the metal plate.

7. The turbocharger according to claim 1, wherein
the scroll passage defining plate includes
an outer circumferential wall that constitutes an outer circumferential interior surface of the turbine scroll passage,
an inner circumferential wall that is located inward from the outer circumferential wall in a radial direction of the impeller shaft and constitute an inner circumferential interior surface of the turbine scroll passage, and
a linking wall that links the outer circumferential wall and the inner circumferential wall to each other,
wherein the inner circumferential edge of the scroll passage defining plate extends from the inner circumferential wall and inward in the radial direction of the impeller shaft.

8. The turbocharger according to claim 1, wherein a heat insulator is arranged in the clearance between the passage defining portion of the scroll passage defining plate and the turbine housing.

9. The turbocharger according to claim 1, further comprising a plurality of nozzle vanes that is arranged in the connecting passage and causes exhaust gas in the turbine scroll passage to flow to the turbine chamber,
wherein the metal plate supports the nozzle vanes.

10. The turbocharger according to claim 9, wherein
the nozzle vanes are movable vanes that are pivotally supported by the metal plate so as to be capable of changing a flow passage area of the connecting passage, the turbocharger further comprises a metal support plate, and the support plate cooperates with the metal plate to pivotally support the nozzle vanes and is arranged to be opposed to the metal plate so as to constitute a part of the wall surface of the connecting passage.

11. The turbocharger according to claim 10, further comprising a metal annular plate, wherein the annular plate is arranged to be opposed to the scroll passage defining plate so as to constitute a part of the wall surface of the turbine scroll passage, a thickness of the annular plate is smaller than a thickness of the support plate, and a thickness of the metal plate, and an outer circumferential edge of the annular plate is held between the turbine housing and the bearing housing.

12. The turbocharger according to claim 1, further comprising a metal annular plate, wherein the annular plate is arranged to be opposed to the scroll passage defining plate so as to constitute a part of the wall surface of the turbine scroll passage, and an outer circumferential edge of the annular plate is held between the turbine housing and the bearing housing.

13. The turbocharger according to claim 12, wherein the annular plate includes a annular rib, and the rib protrudes from an inner circumferential portion of the annular plate in the rotation axis direction of the impeller shaft and extends away from the scroll passage defining plate.

14. The turbocharger according to claim 12, wherein the scroll passage defining plate includes a flange portion that extends from the outer circumferential edge portion of the passage defining portion and outward in the radial direction of the impeller shaft, a clearance is provided between the flange portion and the annular plate, and the flange portion extends along the annular plate.

15. The turbocharger according to claim 14, wherein the flange portion extends outward in the radial direction of the impeller shaft such that a clearance is provided between the flange portion of the scroll passage defining plate and the inner circumferential surface of the turbine housing.

\* \* \* \* \*